(12) United States Patent
Rice et al.

(10) Patent No.: US 10,123,514 B1
(45) Date of Patent: Nov. 13, 2018

(54) PET RETENTION DEVICE (71) Applicant: Cory S Rice, Mammoth Lakes, CA (US)

(72) Inventors: Cory S. Rice, Mammoth Lakes, CA (US); Amanda R. Rice, Mammoth Lakes, CA (US)

( * ) Notice: Subject to any disclaimer, the term of this patent is extended or adjusted under 35 U.S.C. 154(b) by 0 days.

(21) Appl. No.: 15/413,388

(22) Filed: Jan. 23, 2017

Related U.S. Application Data (63) Continuation-in-part of application No. 14/662,086, filed on Mar. 18, 2015, now Pat. No. 9,549,535.

(60) Provisional application No. 61/967,467, filed on Mar. 18, 2014.

(51) Int. Cl.
*A01K 27/00* (2006.01)

(52) U.S. Cl.
CPC .......... *A01K 27/004* (2013.01); *A01K 27/001* (2013.01); *A01K 27/005* (2013.01)

(58) Field of Classification Search
CPC .. A01K 27/003; A01K 27/004; A01K 27/005; A01K 27/008
See application file for complete search history.

(56) References Cited

U.S. PATENT DOCUMENTS

| 794,563 | A | * | 7/1905 | Stahlknecht | ......... | A01K 27/002 119/776 |
|---|---|---|---|---|---|---|
| 2,593,940 | A | | 4/1952 | Van Meter | ........... | A01K 27/005 |
| 2,737,154 | A | | 3/1956 | Michonski | ........... | A01K 27/005 |
| 4,745,883 | A | | 5/1988 | Baggetta | ............... | A47D 13/086 |
| 4,880,197 | A | | 11/1989 | Wsyzynski | ............. | A63H 33/40 |
| 5,357,904 | A | | 10/1994 | Takahashi | ............ | A01K 15/025 |
| 5,718,189 | A | | 2/1998 | Blake | ............. | 119/770 |
| 5,749,326 | A | | 5/1998 | Jones | ................... | A01K 27/005 |
| D408,103 | S | | 4/1999 | Snedeker | ..................... | D30/153 |
| 6,006,699 | A | | 12/1999 | Keever | ................. | A01K 27/005 |
| 6,053,129 | A | | 4/2000 | Akre | .................. | A01K 27/005 |
| 6,164,048 | A | | 12/2000 | Rhodes | ................ | A01K 27/005 |
| 6,382,139 | B1 | | 5/2002 | Rhodes | ................ | A01K 27/005 |
| 6,971,334 | B1 | | 12/2005 | Livesay et al. | ............... | 119/798 |
| 7,103,943 | B2 | | 9/2006 | Lambert | ...................... | 119/792 |
| 7,281,495 | B2 | | 10/2007 | Wagner | ......................... | 119/793 |
| 7,530,334 | B1 | | 5/2009 | Napolitano | .......... | A01K 27/005 |
| D601,067 | S | | 9/2009 | Forrest | ................. | A01K 27/003 |
| 8,088,088 | B2 | | 1/2012 | Hurley | .................... | A61F 5/026 |
| 8,327,808 | B2 | | 12/2012 | Chirico | ........................ | 119/792 |
| 8,360,011 | B2 | * | 1/2013 | Johnson | ................. | A01K 27/00 119/712 |
| 8,372,023 | B2 | | 2/2013 | Garth | ...................... | A61F 5/028 |
| 2002/0040690 | A1 | | 4/2002 | Ganz | .................... | A01K 27/001 |
| 2005/0042562 | A1 | | 2/2005 | Lei | ................... | 119/792 |
| 2006/0042562 | A1 | * | 3/2006 | Wagner | ................ | A01K 27/001 119/792 |
| 2007/0006821 | A1 | | 1/2007 | Mitnick | ............... | A01K 27/003 |
| 2007/0006823 | A1 | | 1/2007 | Sandberg | ............. | A01K 15/021 |
| 2007/0215064 | A1 | | 9/2007 | Petersen | .................. | A01K 1/04 |
| 2008/0072845 | A1 | | 3/2008 | Head | ........................ | A01K 1/04 |
| 2009/0071417 | A1 | | 3/2009 | Simmensen | ......... | A01K 27/001 |
| 2010/0050955 | A1 | | 3/2010 | Pacheco | .............. | A01K 27/009 |

(Continued)

*Primary Examiner* — Monica L Williams (74) *Attorney, Agent, or Firm* — Bauer Law Offices; Robert M. Bauer (57) ABSTRACT

A device is configured so as to restrain the movements of a pet. The device has a material which can be extended so that the device can function as a leash or which can be compressed so that the device can be secured around the neck of the pet.

15 Claims, 9 Drawing Sheets

(56) References Cited

U.S. PATENT DOCUMENTS

| | | | |
|---|---|---|---|
| 2011/0315090 A1 | 12/2011 | Marshall | A01K 27/005 |
| 2012/0137988 A1 | 6/2012 | Kali | A61K 27/003 |
| 2013/0047935 A1 | 2/2013 | Pieper | 119/792 |
| 2013/0074783 A1 | 3/2013 | Chapin | A01K 27/004 |
| 2013/0269628 A1 | 10/2013 | Holt, Jr. | 119/792 |
| 2014/0033992 A1 | 2/2014 | Reed | 119/792 |
| 2014/0076244 A1 | 3/2014 | Byrne | A01K 27/003 |
| 2015/0020751 A1 | 1/2015 | Pattie | 119/770 |
| 2015/0208613 A1 | 7/2015 | Krasilczuk | A01K 1/04 |

* cited by examiner

PET RETENTION DEVICE

This application is a continuation-in-part application of U.S. patent application Ser. No. 14/662,086 filed on Mar. 18, 2015, which in turn claimed the priority benefit of U.S. Provisional Patent Application No. 61/967,467 filed on Mar. 18, 2014, both of which applications are hereby incorporated by reference in their entirety.

FIELD OF THE INVENTION

The invention relates to pet accessories. In particular, the invention relates to a pet retention device that can be used as a leash for pets.

BACKGROUND

Leashes are commonly used for preventing dogs from running too far away from a person. Typically, the leash connects to a harness or a collar around the neck of the dog, and has some sort of handle or other sort of adaptation so that a person can hold the leash to keep the dog within a certain distance. The collar is permanently on the dog, and the leash is utilized when it is desired to limit the distance of the dog, such as when walking in a park or other outside area.

Leashes can be short or long. Longer leashes can be bulky or otherwise unwieldy to carry and can become tangled on the person's legs or other objects as the dog moves. Some leashes are configured to have a variable length. Variable length leashes typically have a mechanism for varying the length, such as a spring-loaded coil mechanism for winding up the leash in a spool. This mechanism can make the leash relatively more expensive to manufacture, bulky or prone to mechanical failure. The material of the leash may also be compromised to facilitate spooling or other action taken to vary the length. This may compromise the strength of the leash or cause it to be made out of a hard or expensive material.

BRIEF SUMMARY

The following is intended to be a brief summary of the invention and is not intended to limit the scope of the invention.

The preferred embodiments of the invention include a pet retention device that can be arranged to be shorter to fit around a pet's neck (such as a collar or necklace) or body (such as a harness), but can also easily be arranged to be longer to act as a leash.

The pet may permanently wear the device so that a leash is readily available for the pet whenever desired and does not need to be remembered or carried. The device offers a variable length leash that is less expensive to manufacture than typical variable length leashes. The leash can also be stronger and more suitable than typical length leashes that are spooled or have a spring-like mechanism.

There are several objectives and advantages of the preferred embodiments. Some of them are: to have the pet carry the leash, a strong standard leash ready to be used at anytime, an affordable length reducing leash, and to have the leash always attached to the collar/harness so as to never forget a retention device. Still other advantages will become apparent from further reading.

DETAILED DESCRIPTION OF THE PREFERRED EMBODIMENTS

A first preferred embodiment of the invention is now described with reference to FIGS. 1-3K and the following:

REFERENCE NUMERALS

1—Two Part Snap (1A and 1B)
2—Hollow flexible material
3—Magnetic Bead
4—Friction Device (Cord Lock)
5—Cord
6—Swivel Hook (or other connection device)
7—Pet Retention Device The pet retention device according to the first preferred embodiment is comprised of a hollow flexible material 2, such as tubular webbing, with a cord 5 running inside the length of the hollow material 2. Cord 5 comes out of a hole in the middle of the hollow material 2, goes into a friction device 4, through a magnetic bead 3, back through the friction device 4, and back into the hollow material 2. The cord 5 is sewn to both ends of the retention device 7. This allows cord 5 to be pulled, the length of the hollow material to be compressed and reduced, and then the length of retention device 7 expanded and returned to a normal size as desired by a user. A two part snap 1A and 1B connects each end of the device 7. The magnetic bead 3 helps control the extra amount of cord 5 when the leash is short. The friction device 4 may alternatively be a cord lock which secures or holds the cord in place.

Figure 1:
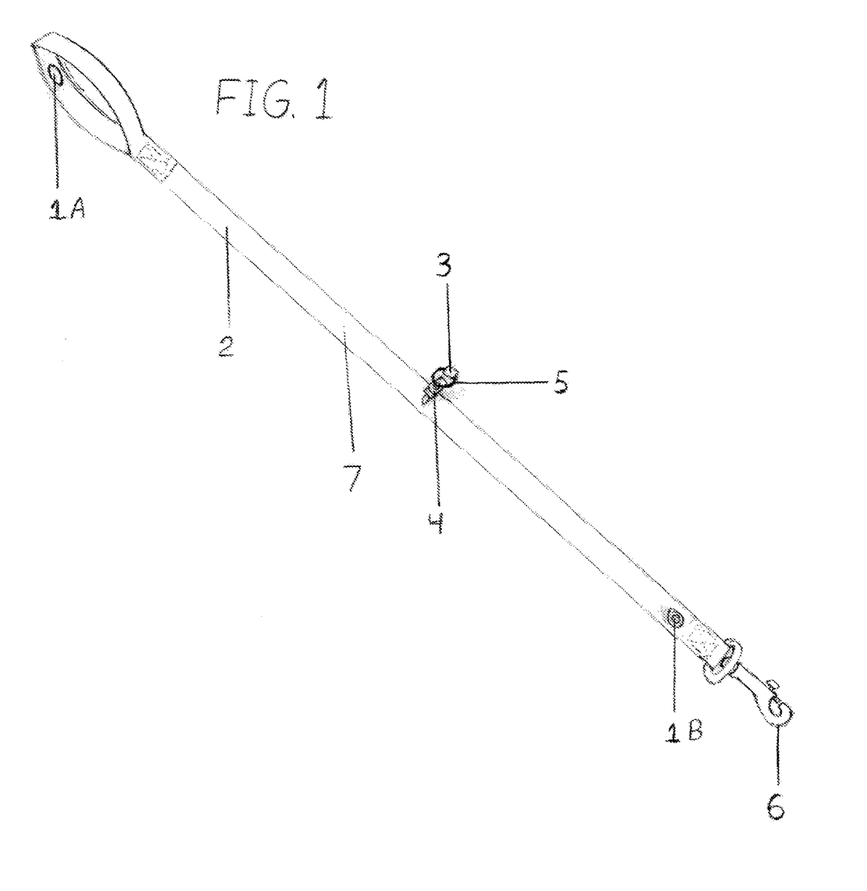
FIG. 1 is an illustration of a first preferred embodiment of the pet retention device when it is extended and ready for use as a leash.

The hollow material 2 is selected so as to be flexible, and yet provide sufficient strength for the device 7 to restrain the pet when extended as shown in FIG. 1. Suitable tubular webbing is tubular polyester webbing or tubular nylon webbing, which can be obtained from strapworks.com of Eugene, Oreg. The material need not be tubular, but may have any type of cross-section. There may be different types of hollow material used, in particular, there may be different strengths, cross-sectional widths or lengths. It may be, for example, 1 inch, 1½ inches, or 2 inches wide. It may be 4 feet, 5 feet, 6 feet long, or longer (for example when used with a pony or horse). Other materials that may be considered include flexible neoprene, tubular cotton products, and most any other supple yet sturdy hollow material. The hollow material 2 may be especially adapted to facilitate compression and expansion. For example, it may be crimped or otherwise altered at intervals along its length so as to facilitate an accordion like compression. It may be alternatively constructed to facilitate and/or further extension by a user.

As the retention device is compressed, it becomes increasingly harder to pull the cord 5 through to compress the device further. The cord 5 or the interior of the hollow material 2 may be treated so as to provide a smoother surface or otherwise make it easier to pull the cord 5 through the hollow material 2 even as hollow material 2 is compressed. Alternatively, there may be a liner surrounding the cord 5 or on the interior of the hollow material that facilitates FIG. 1 is an illustration of the pet retention device 7 at full extension to act as a leash. As indicated above, rather than wire, rope or cord, the main part of the device 7 is comprised of a hollow material 2. When the retention device is used as a leash, the internal cord 5 is located inside of the hollow material 2 and serves no function. The swivel hook 6 is the attachment point to a separate collar or harness already on the pet (not shown in FIG. 1). The two part snap 1, magnetic bead 3, and friction device 4 remain present but serve no function when pet retention device 7 is used as a leash.

Figure 2:
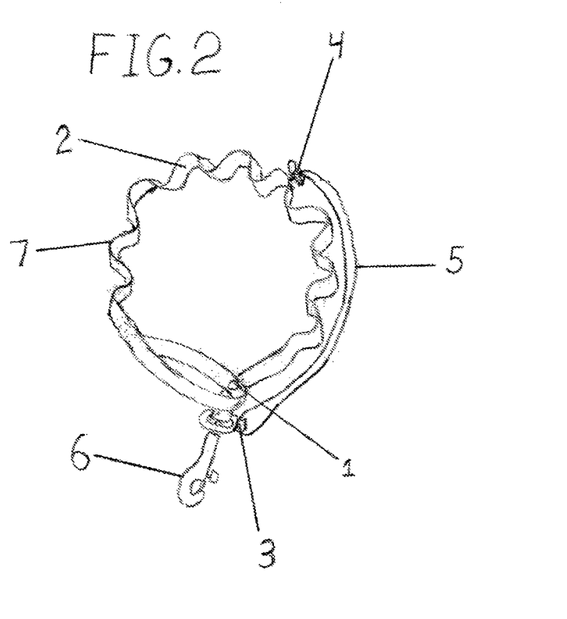
FIG. 2 is an illustration of the arrangement of the first preferred embodiment of the pet retention device when it is used as a collar or necklace on the pet rather than as a leash.

When a leash is not needed, the user loops the retention device 7 around the pet's neck or body and snaps it together as shown in FIG. 2 to be used as a collar or necklace. The hollow material 2 may be patterned or otherwise decorative to increase its attractiveness when it is idly on the pet and not being used as a leash.

To convert retention device 7 from use as a leash, the cord 5 is pulled through the friction device 4, thereby reducing the length of the hollow material 2. The user then pulls on magnetic bead 3 and slides the friction device 4 down the cord 5 to reduce the effective length of the hollow material 2. Once the desired length is found, the user lets go of the friction device 4 which holds the cord in place. The magnetic bead 3 can connect to the swivel hook 6 (if it is metal) or any metal on the pet's separate collar or harness. This controls the cord 5 when it is external to and not inside the hollow material 2. To control the cord 5 even more, the user can wrap it around the retention device 7 before attaching it to any metal.

The hollow material 2 is snapped together by two part snap 1A and 1B to form a single unit. This can be placed around the pet's neck or body. The extra cord 5 is held close to the leash and/or pet's neck/body by a magnetic bead 3. As shown, the magnetic bead 3 can connect to the swivel snap hook 6 or other metal parts of the pet's collar or harness. At this time the pet is wearing the retention device 7 like a necklace or collar. The pet can participate in any normal activity.

The hollow material 2 is at full extension and acting as a standard leash. The hollow material 2 is providing the strength for the retention device 7. The internal cord 5, friction device (cord lock) 4, magnetic bead 3, and snap 1 are not being used in FIG. 1. The swivel snap hook 6 is the attachment point to the collar. The internal cord 5 is inside of the tubular webbing.

The retention device 7 can also easily convert from its use as a necklace or collar as shown in FIG. 2 to act as a leash as shown in FIG. 1. The user starts by disconnecting the two part snap 1A and 1B. The friction device (cord lock) 4 automatically lets the accessory cord 5 slide back into the hollow material 2. The magnetic bead is pulled off the metal it is attached to, and the hollow material 7 is fully extended by the user by manually pulling its two ends apart. The retention device 7 is then able to act as a leash where the properties of the hollow material, swivel hook, and how it is sewn provide the strength for the leash.

FIG. 2 shows the dog leash 7 in the shortened position. The cord 5 has been pulled through the friction device (cord lock) 4 which reduces the length of the tubular webbing 2. The tubular webbing 2 has been snapped together by the snap 1 to form a single unit. This can be placed around the dog's neck or body. The extra cord 5 is held close to the leash and/or dog's neck/body by a magnetic bead 3. As shown, the magnetic bead 3 can connect to the swivel snap hook 6 or other metal parts of a dog's collar or harness.

Operation

The leash is made up of tubular webbing with a cord running inside the length of the tubular webbing. In the middle of the webbing the cord comes out of a hole, goes through a friction device (cord lock), through a magnetic bead, back through the friction device, and back into the webbing. The internal cord is sewn at both ends of the leash. This allows the cord to be pulled, the length of the tubular webbing to be reduced, and then the length returned to a normal size. There is a snap that connects each end of the leash. The magnetic bead helps control the extra cord when the leash is short.

The dog leash is designed to act like a standard leash while at full extension and should work with most collars or harnesses. The leash is attached to a collar or harness that is already on the dog via the swivel hook. When the leash is not needed, the user loops the leash around the dog's neck or body and snaps it together as shown in FIG. 2. The user then pulls on the magnetic bead and slides the friction device (cord lock) down the cord to reduce the size of the leash. Once the desired length is found, the user lets go of the friction device (cord lock) which holds the cord in place. The magnetic bead can connect to the metal swivel hook or any metal on the dog's collar or harness. This controls the extra accessory cord. To control the extra cord even more, the user can wrap the cord around the leash before attaching it to the metal. At this time the dog is wearing the leash like a necklace, collar, or harness. The dog can participate in any normal activity.

When a standard leash is desired, the user disconnects the snap. The friction device (cord lock) automatically lets the accessory cord slide back into the tubular webbing; the magnetic bead is pulled off the metal, and the leash fully extends. The leash is now a standard leash where the properties of the tubular webbing, swivel hook, and how it is sewn provide the strength for the leash.

Figure 3A:
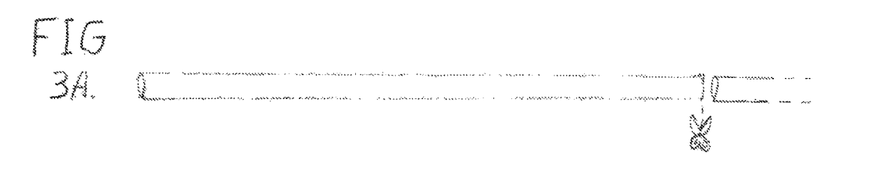
FIGS. 3A-3K are step-by-step instructions of the process of making a pet retention device according to the first preferred embodiment.
Figure 3B:
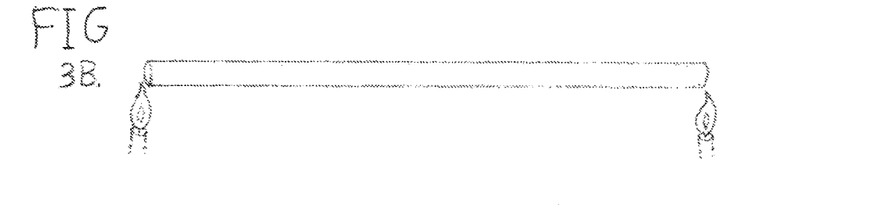
Figure 3C:
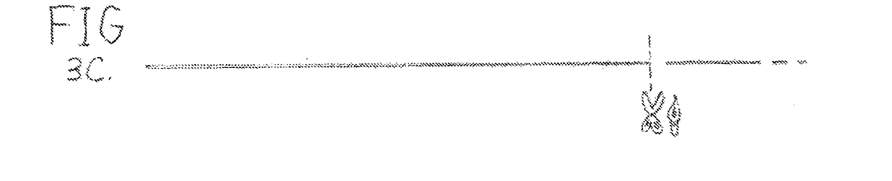
Figure 3D:
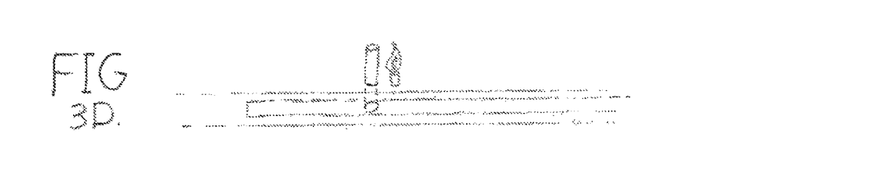
Figure 3E:
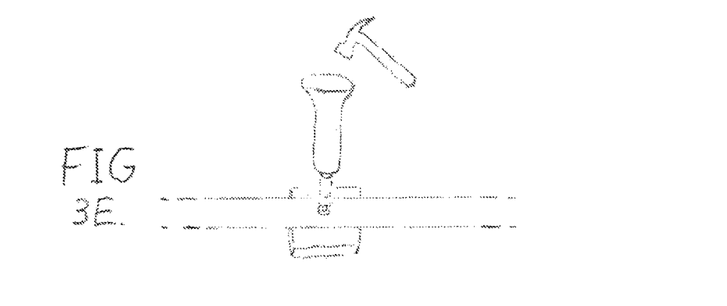
Figure 3F:
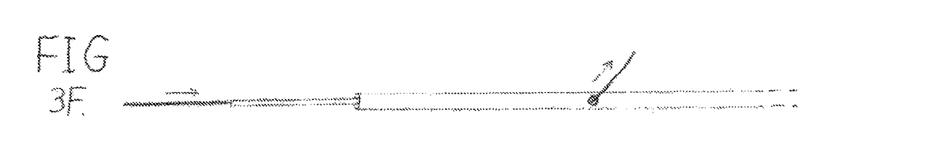

The first preferred embodiment shown in FIGS. 1 and 2 has the advantage that it is manufactured as shown in FIGS. 3A-3K. First, cut hollow material 2 to the desired length (for example, 5 or 6 feet). See FIG. 3A. If needed, burn ends of hollow material 2 to prevent fraying. FIG. 3B. Obtain a cord that is slightly less in length than hollow material 2 or cut a longer piece of cord using a hot knife. FIG. 3C. The cord 5 is preferably of small radius, such as 2 mm, and the length for a foot material would be, for example, 4'8" long. Place a metal wand in material 2 and burn/cut a hole slightly off center from the two ends of the material 2. FIG. 3D. A specialized hot knife hole cutter or other device used for snap rivets may be used. The hole may be, for example, 26" from one side of a 5 foot material. Slide a rivet down the middle of the hollow material 2 and hammer into place using a rivet setter. FIG. 3E. Starting from the side of the material 2 with the shortest distance to the rivet, slide tubing down the center of material 2. FIG. 3F. Push the cord 5 through the material 2 and out the rivet. Pull the tubing out and pull the cord 5 about an inch into the hollow material 2.

Figure 3G:
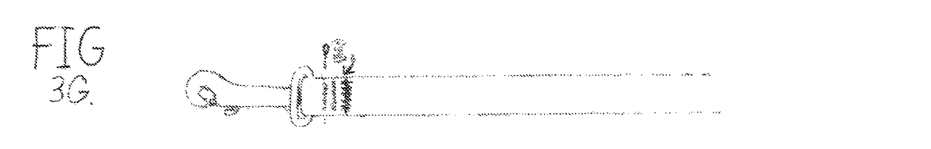
Figure 3H:
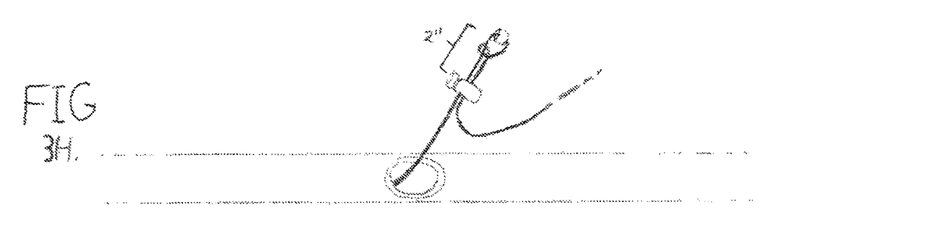
Figure 3I:
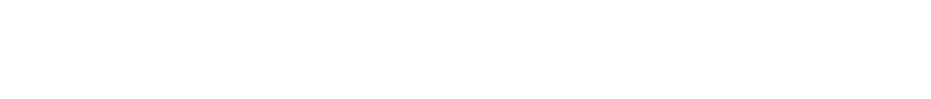
Figure 3J:
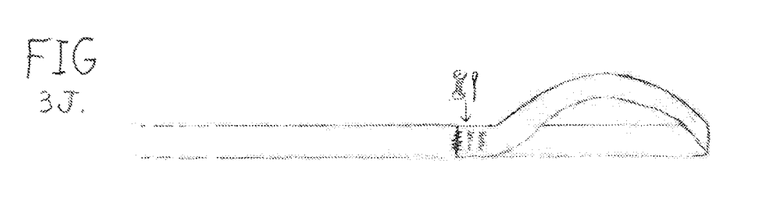
Figure 3K:
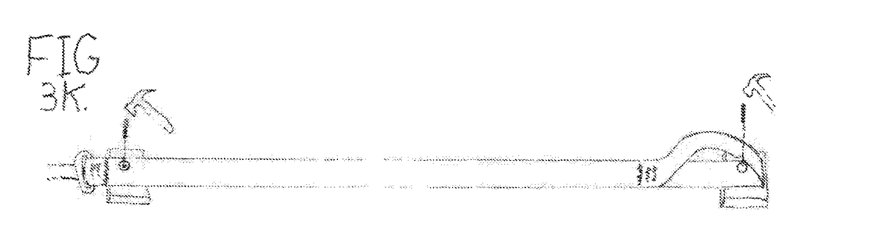

Sew the swivel snap hook 6 on to the end of the hollow material 2 (using, for example, 3 inches of the hollow material to ensure a strong connection). FIG. 3G. Fold it away from the rivet side. Use three bar tack stitches with one of them holding the end of the hollow material down. Put the end of the cord 5 through the friction device 4 and then through the magent. FIG. 3H. Tie the magnet in place, preferably about 2" from the cord lock 4. Put the end of the cord 5 back through the cord lock 4, double checking that there is a suitable distance, preferably about 2 feet, from the cord lock 4 to the magent 3. Slide the hollow material 2 down the center of the hollow material 2 stopping at the rivet. FIG. 3I. Push the rest of the cord through the hollow material. Pull the hollow material 2 out. Use part of the hollow material, preferably about 12 inches, to create a handle. FIG. 3J. Fold it away from the rivet side and sew in place using three bar tack stitches with one of them holding down the end of the hollow material 2. Put in each end of two part snap 1A and 1B using an appropriate tool, such as a specialized large needle. One end on the handle with the smoothest part of the snap should face the inner handle. With the rivet side up, place just before the end of the hollow material 2. The other end of the snap next to the sewing holding the swivel snap hook. With rivet side up, place at the top and so the snap is the same as rivet side.

A second preferred embodiment of the invention is now described below with reference to FIGS. 4-6. This embodiment uses a polyurethane self-coiling main portion 8 connected to webbing material at each end. The main portion 8 has a coil memory to allow it to automatically compress after being fully extended. It is waterproof, flexible, and provides some stretch after being fully extended. The first webbing material is formed in the shaped of a handle. The second webbing material connects the self coiling main portion 8 to swivel hook 6. The swivel hook can be sewn in like the first embodiment, or it can be tied.

Figure 4:
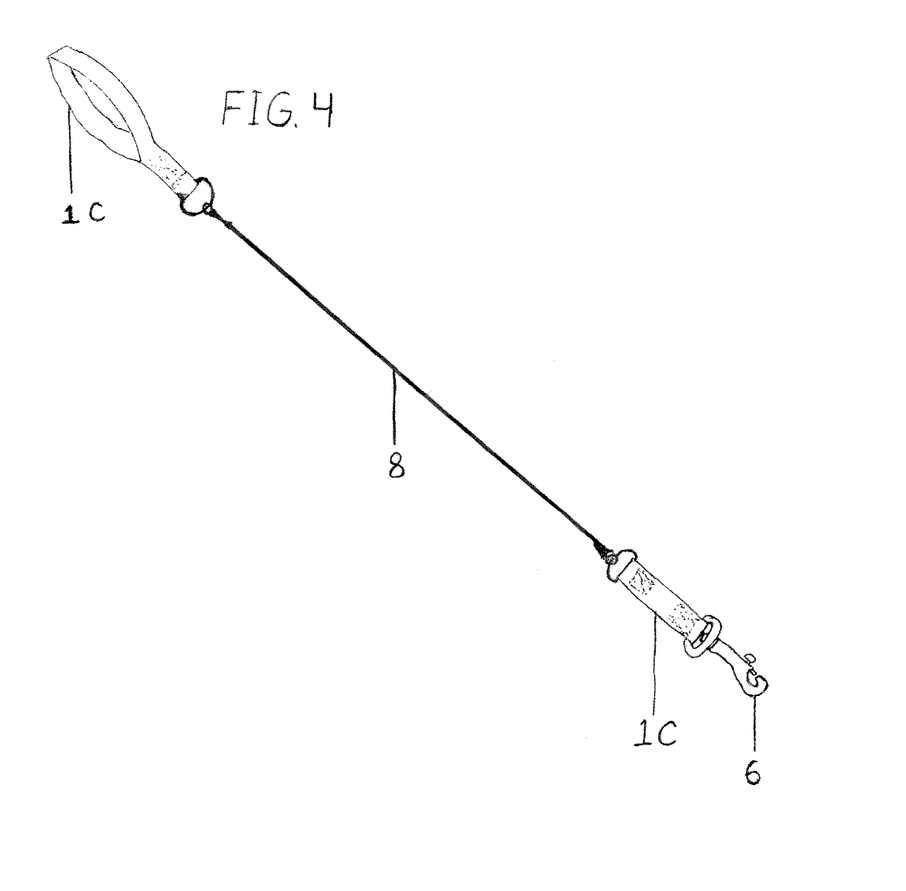
FIG. 4 is an illustration of a second preferred embodiment of the pet retention device when it is extended and ready for use as a leash.

When pulled by a user, the retention device becomes elongated as shown in FIG. 4 and can be used as a leash. When the retention device is not pulled, the self-coiling main portion 8 coils roughly as shown in FIG. 5. The two webbing materials on each end of main portion 8 have velcros sewn onto them. When the retention device is coiled, the velcro can be attached to each other while the device is placed around the pet's neck to secure the device in place for later use.

Figure 5:
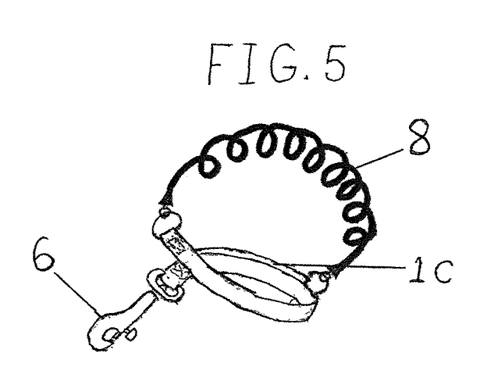
FIG. 5 is an illustration of the arrangement of the second preferred embodiment of the pet retention device when it is used as a collar or necklace on the pet rather than as a leash.
Figure 6A:
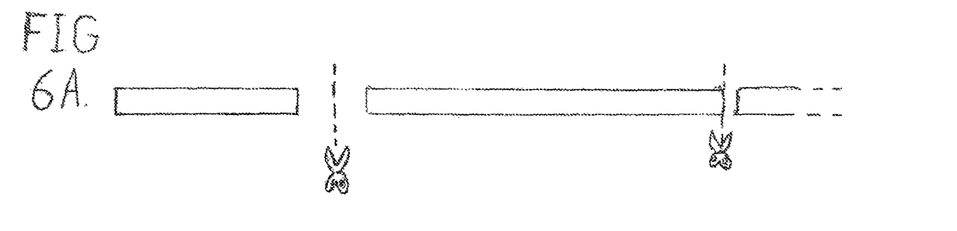
FIGS. 6A-6F are step-by-step illustrations of the process of making a pet retention device according to the second preferred embodiment.
Figure 6B:
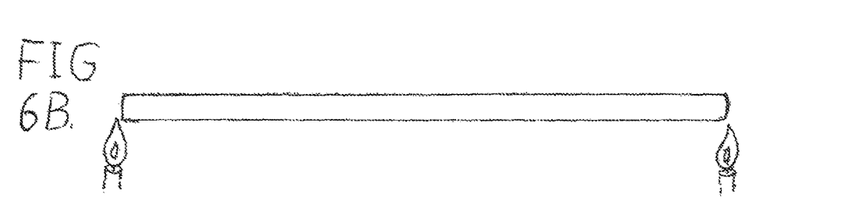
Figure 6C:
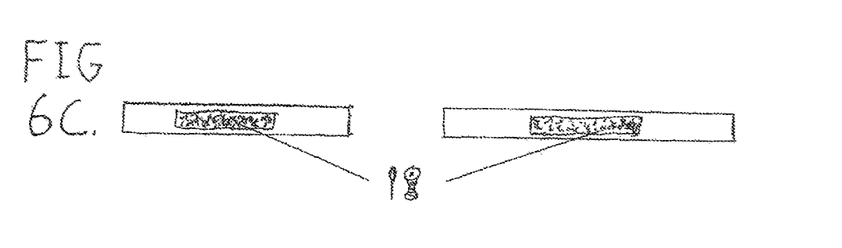
Figure 6D:
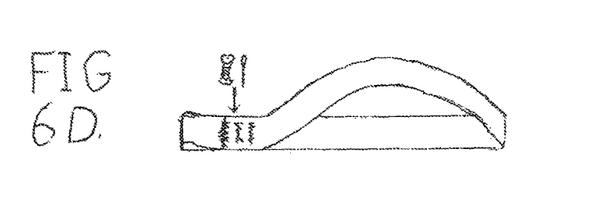
Figure 6E:
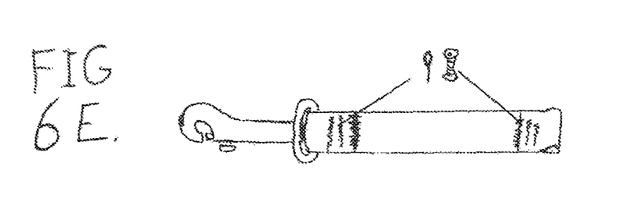
Figure 6F:
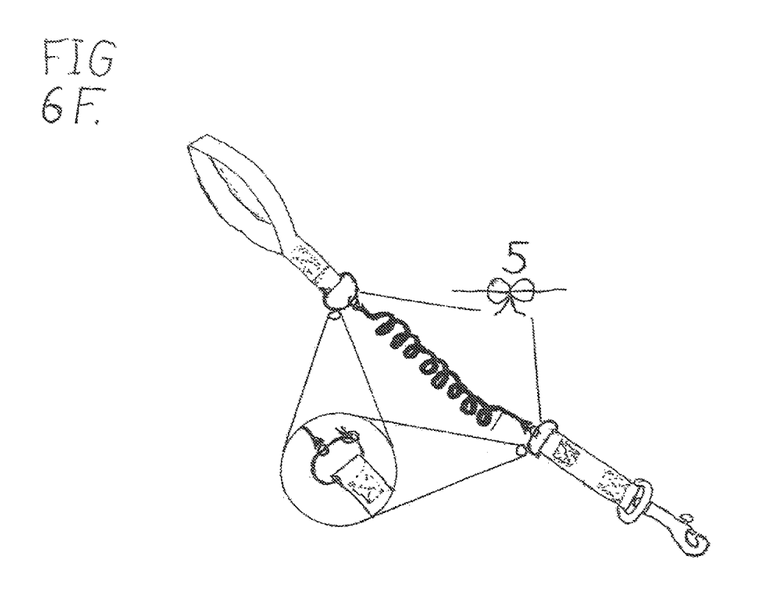

The second preferred embodiment shown in FIGS. 4 and 5 has the advantage that it is easily manufactured as shown in FIGS. 6A-6F. First, cut webbing material into parts. See FIG. 3A. If needed, burn ends of the webbing material to prevent fraying. FIG. 6B. Sew velcro IC into the two parts of the webbing material. FIG. 6C. Fold and sew one of the parts to be a handle. FIG. 6D. Fold and sew the other part to connect to the swivel snap hook 6. FIG. 6E. Each of the two parts should have a ring sewn into one end thereof. FIG. 6F. Connect the main coiling portion 8 to each of the parts via the ring. See enlarged view in FIG. 6F.

Although several preferred embodiment have been described above, other embodiments may be within the scope of the invention which shall be determined by the claims as currently pending or as may be amended from time to time hereafter.

The invention claimed is:

1. A pet retention device, comprising:
a hollow material, the material being hollow between a connecting part at a first end thereof and a second end thereof configured as a handle;
the hollow material having first and second snaps on the exterior thereof, such that when the first and second snaps are connected, the hollow material is compressed and connected to itself in a circle;
a cord, the cord having a diameter sufficiently small to permit the cord to be contained in the hollow of the hollow material each end of the cord being attached to the interior of the hollow material;
the hollow material having a hole between the first and second ends thereof, the hole permitting the cord to be inserted and located internally of the hollow material when the hollow material is extended; and
a securing element on the cord, the securing element enabling the cord to be outside of the hollow material and secured to either the exterior of the hollow material or to another device when the hollow material is compressed and connected to itself in a circle.

2. The pet retention device as recited in claim 1, wherein the hollow material comprises a tubular webbing.

3. The pet retention device as recited in claim 1, wherein the hollow material can be extended so that it is at least five feet in length and can also be compressed so that it is no more than 18 inches in length.

4. The pet retention device as recited in claim 1, further comprising a cord lock securing the position of a center portion of the cord outside of the hollow material.

5. The pet retention device as recited in claim 1, wherein the cord has a radius of about 2 mm.

6. The pet retention device as recited in claim 5, wherein said one single hole is located at the center of, or slightly off center from, the two ends of the hollow material.

7. The pet retention device as recited in claim 6, wherein a center portion of said cord can be pulled through said one single hole and a friction device so as to be located outside of said hollow material.

8. The pet retention device as recited in claim 7 wherein said friction device comprises a cord lock which holds the center portion of the cord in place outside of the hollow material, the length of said center portion of said cord located outside of said hollow material varying correspondingly to the distance to which the hollow material is compressed.

9. The pet retention device as recited in claim 1, wherein the hollow material has only one single hole.

10. The pet retention device as recited in claim 1, wherein the securing element is a magnetic bead, and the cord passes through the magnetic bead.

11. A dog leash having first and second configurations, the dog leash being unused and stowed around the dog's neck in the first configuration and functioning as a leash in the second configuration, comprising:
a main part, connected to itself in a circle in the first configuration, at least a portion of the main part being hollow;
a hole in a surface of the portion of the main part that is hollow; and a cord having an end secured inside the main part, the cord passing through the hole in a surface of the portion of the main part so that a portion of the cord is available outside of the main part, the portion of the cord available outside the main part being secured to a magnet and the magnet connects to a part of the dog leash when the dog leash is in the first configuration and the portion of the cord outside the main part being unconnected to a part of the dog leash when the dog leash is in the second configuration.

12. The dog leash recited in claim 11, wherein the length of the portion of the cord outside the main part is different in the first configuration than it is in the second configuration.

13. The dog leash recited in claim 11, wherein the cord can be pulled to vary the length of the portion of the cord that is outside the main part.

14. The dog leash recited in claim 11, further comprising a mechanism outside the main part which ensures that at least part of the cord is always outside the main part of the leash.

15. The dog leash recited in claim 11, wherein the cord has a diameter of less than 0.5 centimeters.

\* \* \* \* \*